United States Patent
Menke

(10) Patent No.: US 12,172,850 B2
(45) Date of Patent: Dec. 24, 2024

(54) FLOW CONTROL OF PRODUCT TRANSPORT

(71) Applicant: REXNORD FLATTOP EUROPE B.V., 'S-Gravenzande (NL)

(72) Inventor: Cornelis Hendrik Mijndert Menke, The Hague (NL)

(73) Assignee: REXNORD FLATTOP EUROPE B.V., 'S-Gravenzande (NL)

( * ) Notice: Subject to any disclaimer, the term of this patent is extended or adjusted under 35 U.S.C. 154(b) by 249 days.

(21) Appl. No.: 17/910,157

(22) PCT Filed: Mar. 8, 2021

(86) PCT No.: PCT/NL2021/050156
§ 371 (c)(1),
(2) Date: Sep. 8, 2022

(87) PCT Pub. No.: WO2021/182949
PCT Pub. Date: Sep. 16, 2021

(65) Prior Publication Data
US 2023/0096997 A1 Mar. 30, 2023

(30) Foreign Application Priority Data
Mar. 9, 2020 (NL) .................................... 2025084

(51) Int. Cl.
*B65G 47/31* (2006.01)
*B65G 21/20* (2006.01)
(Continued)

(52) U.S. Cl.
CPC ....... *B65G 47/682* (2013.01); *B65G 21/2072* (2013.01); *B65G 47/31* (2013.01);
(Continued)

(58) Field of Classification Search
CPC .. B65G 21/2072; B65G 47/31; B65G 47/682; B65G 47/70
(Continued)

(56) References Cited

U.S. PATENT DOCUMENTS 5,768,860 A * 6/1998 Weaver .............. B65G 21/2072
198/444
6,059,096 A * 5/2000 Gladieux ........... B65G 21/2072
198/836.3
(Continued)

FOREIGN PATENT DOCUMENTS

DE 4304814 A1 8/1994
DE 102006034283 A1 * 12/2007 ........... B65G 47/682
(Continued)

OTHER PUBLICATIONS

PCT International Search Report and Written Opinion, PCT/NL2021/050156, May 28, 2021, 11 pages.

*Primary Examiner* — Douglas A Hess
(74) *Attorney, Agent, or Firm* — Quarles & Brady LLP

(57) ABSTRACT

A method and system (100) for controlling transport of products (1). The products (1) are guided by at least one conveyor surface (10) through a control zone (15). A flow profile (Fm) of the products (1) in the control zone (15) is measured. The measured flow profile (Fm) is compared to one or more predetermined flow patterns (P1,P2,P3) for controlling the transport based on the comparison. Preferably, the flow profile (Fm) is measured by a sensor device (20) disposed adjacent the transported products, e.g. using LIDAR.

16 Claims, 4 Drawing Sheets

(51) Int. Cl.
*B65G 47/68* (2006.01)
*B65G 47/70* (2006.01)

(52) U.S. Cl.
CPC ...... *B65G 47/70* (2013.01); *B65G 2203/0233* (2013.01); *B65G 2811/095* (2013.01)

(58) Field of Classification Search
USPC ........................................................ 198/444
See application file for complete search history.

(56) References Cited

U.S. PATENT DOCUMENTS

| | | | |
|---|---|---|---|
| 6,328,151 B1 * | 12/2001 | Spangenberg ..... | B65G 21/063 198/452 |
| 7,942,255 B2 * | 5/2011 | Seger ................... | B65G 47/682 198/452 |
| 8,220,615 B2 * | 7/2012 | Petrovic ............... | B65G 47/682 198/452 |
| 10,538,396 B2 * | 1/2020 | Berger ................. | B65G 47/683 |
| 10,647,520 B2 * | 5/2020 | Hartmann ............ | G05B 19/418 |
| 11,691,825 B2 * | 7/2023 | Murray ................. | G06M 11/00 198/502.2 |
| 2005/0137744 A1 | 6/2005 | Winkelmolen et al. | |
| 2017/0362036 A1 | 12/2017 | Hartmann et al. | |

FOREIGN PATENT DOCUMENTS

| | | | | |
|---|---|---|---|---|
| FR | 2576002 A1 | 7/1986 | | |
| JP | S60106713 A | 6/1985 | | |
| WO | WO-2012122632 A1 * | 9/2012 | ............. | B65G 43/08 |
| WO | 2018160218 A1 | 9/2018 | | |

\* cited by examiner

FLOW CONTROL OF PRODUCT TRANSPORT

CROSS-REFERENCE TO RELATED APPLICATIONS

This application is a 371 application of PCT/NL2021/050156 filed on Mar. 8, 2021. which claims priority of Netherlands patent application 2025084 filed on Mar. 9, 2020, both of which are incorporated by reference herein in their entirety.

TECHNICAL FIELD AND BACKGROUND

The present disclosure relates to methods and systems for controlling transport of products via one or more conveyor surfaces.

In facilities such as factories and warehouses there is a need for the transport of products such as bottles, cans, boxes, and other goods. For example, the products need to be transported between different processing stations for, e.g., filling, labeling, packaging, or other processing. A preferred mode of transportation may involve carrying the products by one or more conveyor surfaces. During transport, the products may change between conveyor surfaces having different directions and/or velocities. This may also change the arrangement or flow of the products. For example, products may enter a first processing station in single file to be filled or labelled, while the files are stacked to enter a second station, e.g. for packaging. Controlling the transitions between different product flows, may present particular challenges. For example, when products are transported from a relatively fast moving conveyor to a relatively slow moving conveyor, or vice versa, there can develop an excess or shortage of products. Additionally or alternatively, when products are pushed onto another conveyor, they may need to adapt their velocity, sometimes in a different direction.

Typically, the transport of products can be controlled by monitoring and adjusting various transport conditions or parameters. Some parameters such as the relative velocities of the conveyor belts can monitored and controlled in a straightforward manner, e.g. adding velocity sensors. Other parameters such as the friction coefficient between the products and conveyor can be more difficult to determine and/or control. For example, WO 2018/160218 A1 describes monitoring and removing contaminants from a conveyor surface based upon predicted frictional engagement qualities detected on a conveyor surface.

While the known methods and systems may provide further control by monitoring various parameters affecting the transport conditions, there remains a need for further improvement in controlling the flow of products without having to monitor every condition separately.

SUMMARY

Aspects of the present disclosure relate to a methods and systems for controlling the transport of products. Products are guided by at least one conveyor surface through a control zone while a flow profile of the products is measured and compared to one or more predetermined flow patterns. By measuring a flow profile, e.g. side profile of products flowing through the control zone, their collective behavior can be determined. The inventors find that control parameters can be adjusted based on the measured product flow instead of trying to measure and control each of the circumstances. For example, it is not necessary or useful to measure and/or model the friction coefficient and conveyor velocities when each may affects to the resulting flow in an unpredictable manner based on a combination of effects. By instead using the flow profile as feedback for the control, the resulting flow can be maintained according to a predetermined optical pattern, or non-desired pattern can be avoided. While, the flow profile can in principle be measured in various ways, there are particular advantages to the use of a LIDAR system. For example, the LIDAR can be used to measure the product flow by recording the lateral surfaces of the nearest row of products, even if there are additional rows behind, which can be inferred from the overall system layout. Accordingly, it is not necessary to rely e.g. on complicated camera systems or other sensor devices.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1:
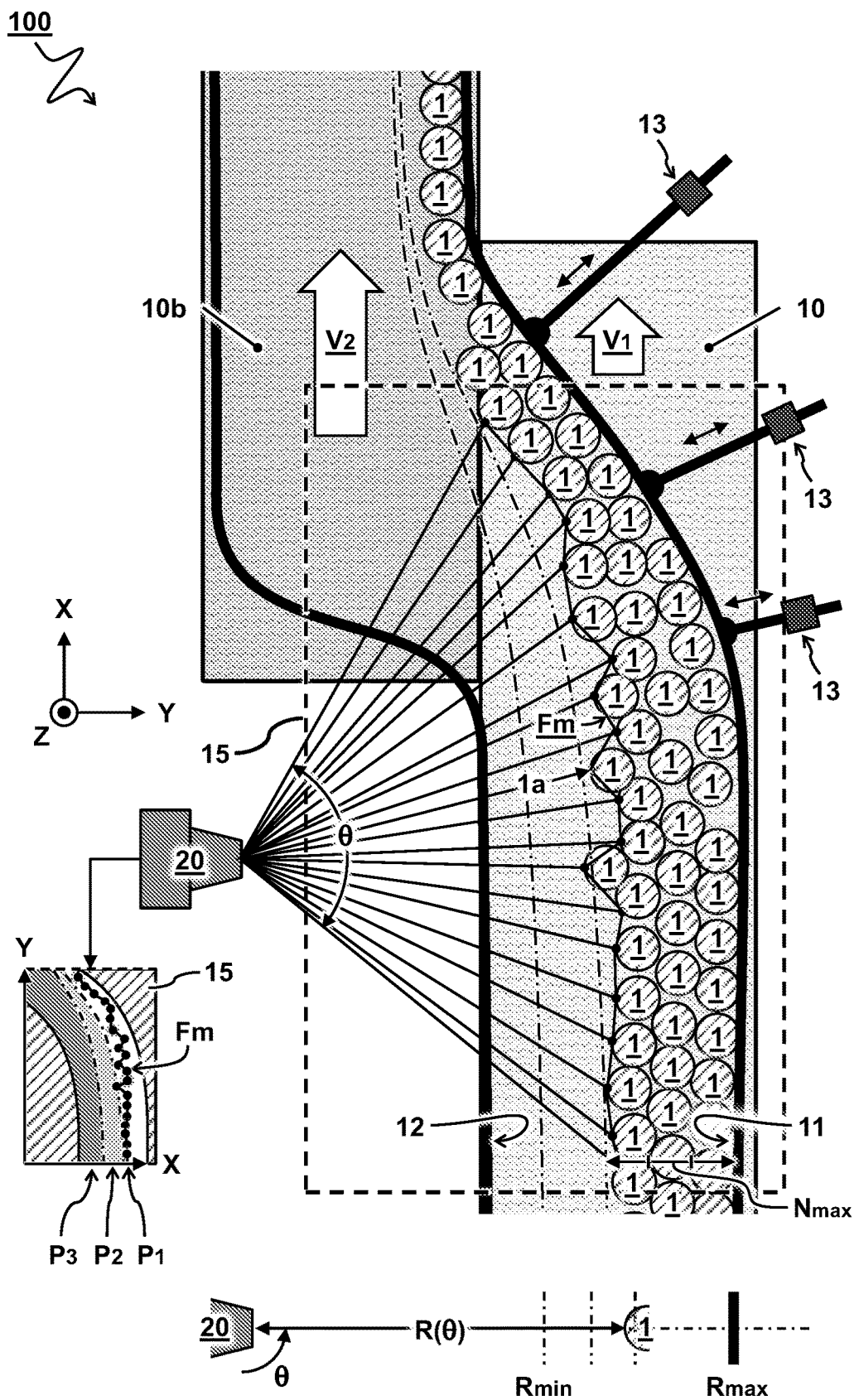
FIG. 1 illustrates controlling a flow of products transported by conveyor surfaces.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 illustrates controlling transport of products 1. In one embodiment, the products 1 are guided by at least one conveyor surface 10 through a control zone 15. In another or further embodiment, a flow profile "Fm" of the products 1 in the control zone 15 is measured. In another or further embodiment, the measured flow profile "Fm" is compared with one or more predetermined flow patterns P1,P2,P3. The transport can be controlled based on the comparison.

In some embodiments, the measured flow profile "Fm" indicates a spatial distribution of at least a subset of the products 1 in a horizontal plane of the control zone 15. In other or further embodiments, the measured flow profile "Fm" comprise a set of spatial coordinates indicating locations of products 1 in the control zone 15. For example, the spatial coordinates can be expressed in Cartesian coordinates X,Y and/or polar coordinates R,θ. In one embodiment, the coordinates may be converted, e.g. wherein the positions are measured in polar coordinates and stored or compared based on Cartesian coordinates. Alternatively, the coordinates are stored and/or compared in the coordinate system wherein they are measured.

In some embodiments, the flow profile "Fm" is measured from a lateral side 1a of the products 1. For example, the flow profile "Fm" is measured by a sensor device 20 disposed adjacent the products 1. In one embodiment, the flow profile "Fm" is measured by determining a respective distance R between the products 1 and sensor device 20. In another or further embodiment, the distance R is measured from a single point on the sensor device 20. Preferably, the distance R is measured as a function of at least one angle θ varying (at least) in a horizontal plane XY of the control zone 15. Also other or further angles can be used.

In some embodiments, the sensor device 20 is configured to exclusively measure lateral surfaces 1a of products 10 directly facing the sensor device 20. In other or further embodiments, the sensor device 20 is configured to exclusively measure a subset of the products 10 in a (single) row, e.g. closest to the sensor device 20.

In some embodiments, e.g. as shown, wherein the products 1 are guided through the control zone 15 by a side rail 11 contacting the products 1 on a first side. In other or further embodiments, the flow profile "Fm" is measured by a sensor device 20 measuring a second side of the products 1. For example, the second side is opposite the first side. In one embodiment, exclusively products 1 on the second side of the flow profile are measured. In another or further embodiment, the side rail 11 is at an angle with respect to a movement direction X of the conveyor surface 10, wherein products 1 abutting the side rail 11 are forced by the rail to move partially transverse −Y to the movement direction of the conveyor surface determining the flow profile "Fm". In some embodiments, the flow profile "Fm" comprises a relatively wide stream of relatively slow moving products at a start of the control zone 15 being funneled into a relatively narrow stream of relatively fast moving products 1 at an end of the control zone 15, or vice versa.

In a preferred embodiment, the sensor device 20 comprises an emitter for emitting a beam towards the products 1, and a sensor for sensing a reflection of the beam from the products 1. Most preferably, the flow profile "Fm" is measured by a sensor device 20 using LIDAR ("LIght Detection And Ranging" or "Laser Imaging Detection And Ranging"). LIDAR typically uses active sensors that supply their own illumination source. The energy source hits objects and the reflected energy is detected and measured by sensors. For example, the distance to the object is determined by recording the time between transmitted and backscattered pulses and by using the speed of light to calculate the distance traveled. LIDAR typically uses ultraviolet, visible, or near infrared light to image objects. Wavelengths may vary to suit the target: from about 10 micrometers infrared to approximately 250 nm UV. Typically, light is reflected via backscattering, as opposed to pure reflection one might find with a mirror. Different types of scattering are used for different LIDAR applications: most commonly Rayleigh scattering, Mie scattering, Raman scattering, and fluorescence. For example, 600-1000 nm lasers are most common for non-scientific applications. The maximum power of the laser can limited, or an automatic shut off system which turns the laser off at specific altitudes is used in order to make it eye safe for the people in the ground. One common alternative, 1550 nm lasers, are eye-safe at relatively high power levels since this wavelength is not strongly absorbed by the eye.

In some embodiments, the LIDAR can be used to measure also other or further features of the product flow. For example, the sensor device 20 is configured to simultaneously measure a position and velocity of the products 1. Also other or further properties can be determined by the sensor device 20. In one embodiment, the sensor device 20 is configured to measure a surface property of the products. For example, an amount or spectrum of the reflected light can be used to determine a reflection coefficient or other surface properties. While the preferred sensor device as described herein is based on LIDAR, also other or further sensor devices can be used to determine similar or additional characteristics of the product flow. For example, a camera can be used to record the product flow and used in combination with image recognition software to determine, e.g. a respective positon of the products. Also, a combination of a light source and sensors can be used to whether products cross a respective light beam there between.

In some embodiments, the predetermined flow patterns P1,P2,P3 comprise definition of one or more of an optimal, acceptable, or unacceptable flow pattern. In one embodiment, the predetermined flow patterns P1,P2,P3 comprise a first pattern P1 according to which the products 1 are intended to flow through the control zone 15, e.g. in accordance with optimal processing conditions. For example, when comparison yields that the flow profile "Fm" is in accordance with the first pattern P1 it may be determined that no changes in control parameters are necessary and the process can continue as is. In another or further embodiment, the predetermined flow patterns P1,P2,P3 comprise a second pattern P2 according to which the products 1 are still allowed to flow through the control zone 15, e.g. in accordance with acceptable processing conditions, but which are sub-optimal. For example, when comparison yields that the flow profile "Fm" is in accordance with the second pattern P2 it may be determined that the process can still continue but one or more control parameters need to be adjusted, e.g. to regain the optimal processing conditions. In another or further embodiment, the predetermined flow patterns P1,P2, P3 comprise a third pattern P3 according to which the products 1 are not allowed to flow through the control zone 15, e.g. in accordance with unacceptable processing conditions. For example, when comparison yields that the flow profile "Fm" is in accordance with the thirds pattern P3 it may be determined that the process can no longer continue, e.g. the processing is halted.

Also other or further conditions can be defined. For example, instead of determining whether a measured flow complies with the third pattern, it can also be determined that the flow does not comply with the first or second pattern. Also less or more than three patterns can be defined. For example, a single pattern can be defined where process parameters are exclusively adjusted when the flow complies with (or deviates from) the pattern. For example, more patterns like the second pattern can be defined wherein different process parameters are adjusted, or to a different degree, depending on the flow pattern.

Flow patterns can be defined in various ways. In some embodiments, one or more flow patterns P1,P2,P3 are set to determine whether the products flow through the control zone 15 by no more than a predetermined maximum of number Nmax of adjacent product rows and/or no less than a predetermined minimum of number of adjacent product rows. For example, in the embodiment shown, the ideal pattern P1 has a maximum Nmax of three adjacent files on the conveyor surface 10. For example, this may depend on the diameter of the products, their packing, and/or position of the side guide 11, e.g. rail. Of course this predetermined number can be different for other embodiments, e.g. one, two, three, four, five, six, et cetera. Under some circumstances, it can occur that an excess of products accumulates on one conveyor surface 10, e.g. because another conveyor 10b surface is too slow, or subsequent processing station cannot handle the influx, e.g. there is a blockage. Also other or further conditions can be preferred as ideal. For example, the ideal pattern may comprise a minimum of at least a single row of products, or another predetermined minimum number of rows. If this is not the case, this may indicate a shortage of products, e.g. from the preceding processing station. These and other circumstances can be detected early by determining the flow profile "Fm" deviates from the ideal pattern P1.

In some embodiments, comparing the measured flow profile "Fm" to a predetermined flow pattern comprises determining whether the flow profile "Fm" complies with the predetermined flow pattern, or deviates from the predetermined flow pattern. In one embodiment, the predetermined flow patterns P1,P2,P3 are defined by dividing the control zone 15 into different areas. For example, the flow patterns are defined by the areas themselves, or a position of one or more borders there between, e.g. line segment. In some embodiments, the flow profile "Fm" complies with a predetermined flow pattern when the products 1 pass through a respective area of the control zone 15 corresponding to that flow pattern. In one embodiment, it is determined how many measurement positions of the flow profile "Fm" are within an area of one of the predetermined flow patterns P1,P2,P3. For example, the absolute or relative number of measurement points within an area corresponding to a specific pattern can be used to determine to what degree the product flow complies with that pattern. In one embodiment, when the number of points of the measured flow profile "Fm" within an area (or between respective borders) of one of the patterns exceeds a threshold minimum, corresponding adjustments can be implemented. In another or further embodiment, one or more overlap areas are determined by which the flow profile "Fm" intersects with one or more of the predetermined flow patterns P1,P2,P3. For example, it can be assumed that the flow profile "Fm" represents a frontal border of the product flow which can be extended to an area between the frontal border and the backside border, e.g. side guide 11. For example, a magnitude of the overlapping area can be a measure for how much the flow profile "Fm" complies with a predetermined flow patterns. In one embodiment, when the area of overlap, e.g. between the flow profile "Fm" and one of the patterns, e.g. P2 or P3, exceeds a threshold area, corresponding adjustments can be implemented.

In some embodiments, the flow profile "Fm" is measured at different instances of time. For example, the flow profile "Fm" is determined to comply with, or deviate from, a predetermined flow pattern, when products 1 are measured to reside in (flow through) a respective area of the control zone 15 during multiple different instances of time, e.g. period of time. For example, a minimum threshold time period is used to distinguish more structural deviations of the flow profile "Fm" from one flow pattern to the next. Also combinations are possible. For example, an area of overlap or number of points in an area can be integrated or added for different instances of time. Accordingly, a more structural deviation can build up.

In some embodiments, one or more control parameter are adjusted according to a proportional, integral, and/or derivative (PID) controller, e.g. taking as input the number of points or overlapping area, optionally integrated over time, and proportionally adjusting a control parameter. For example, the integrated deviation from, or compliance with, a flow pattern may determine an amount adjustment of a control parameter such as the conveyor velocities V1, V2 or e.g. a shape of the side guide 11 by adjusting the guide actuators 13.

In some embodiments, one or more control parameters determining the flow profile of the products are adjusted in response to determining that the measured flow profile "Fm" complies with, or deviates from, one of the predetermined flow patterns P1,P2,P3. In one embodiment, adjusting the control parameters includes adjusting a velocity V1,V2 of one or more conveyor surfaces 10,20 transporting the products through the control zone 15, before the control zone, or after the control zone. In another or further embodiment, adjusting the control parameters includes adjusting a position and/or angle of a side rail 11 guiding the products over the at least one conveyor surface 10. In another or further embodiment, adjusting the control parameters includes adjusting a friction coefficient between the conveyor surface 10 and products 1, e.g. initiating or adjusting cleaning and/or lubrication of one or both of the surfaces of the conveyor or products.

Also other or further control parameters can be adjusted, e.g. a rate of processing products in a processing station preceding or subsequent to the control zone 15. Also combination of control parameters can be adjusted. For example, detecting a deviation from the optimal flow pattern may initially trigger adjustment of a first parameter such a conveyor velocity; and then if the deviation persists, adjustment of a second parameter such as the friction coefficient. As will be appreciated, the combination may yield both an immediate effect by the adjustment of velocity, and a long term effect by the adjustment of the friction coefficient. Some parameters can be temporarily adjusted, e.g. adding lubrication/cleaning, while other parameters may be more permanently adjusted, e.g. velocities V1,V2 or shape of the side rail 11. Alternatively or in addition to adjusting control parameters, the comparison may also cause other types of feedback, e.g. visual or auditory feedback such as an alarm or other indication that the product flow complies with or deviated from preset conditions determined by one or more predetermined flow patterns P1,P2,P3.

Figure 2A:
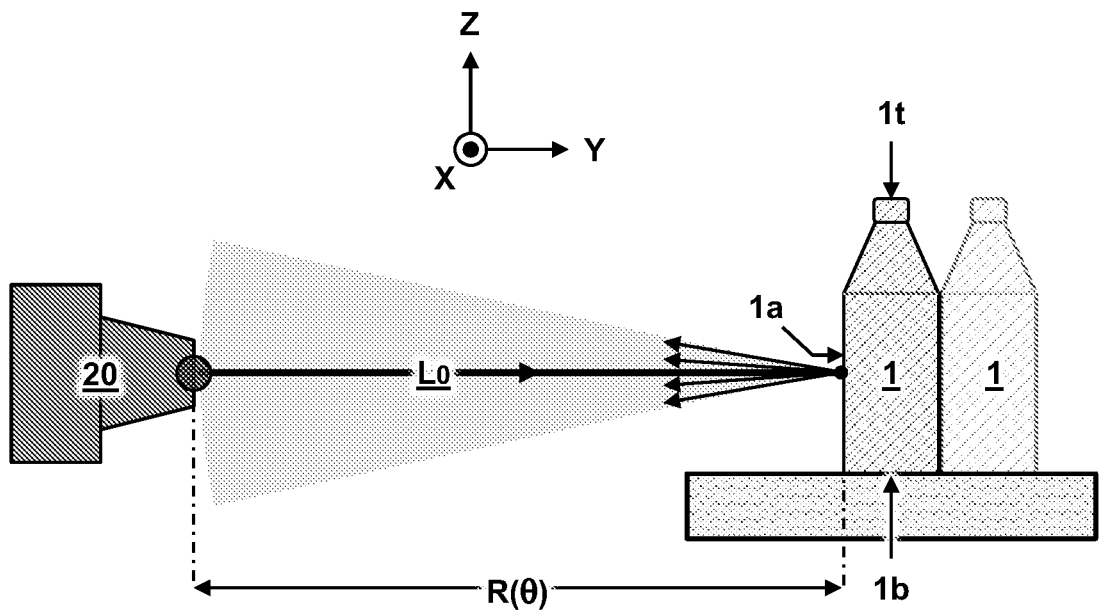
FIG. 2A illustrates a sensor device disposed substantially adjacent the products and scanning their positions in a substantially horizontal plane.

FIG. 2A illustrates a sensor device 20 disposed substantially adjacent the products 1 and scanning their positions in a substantially horizontal plane X,Y. In one embodiment, e.g. as shown light rays LO are emitted by the sensor device 20 substantially within a single plane. This may correspond to the light ray L0 being swept over only one angle θ. Preferably the light is substantially emitted along a horizontal plane XY and/or transvers to a lateral surface 1a of the products 1, which is usually vertical. For example, the light ray L0 hits the lateral surface 1a at an angle of less than sixty degrees, preferably less forty five degrees, more preferably less than thirty degrees, or even less than twenty degrees. Typically, more light may be reflected, the smaller the angle of incidence with respect to a normal of the lateral surface 1a. For example, the sensor device 20

Figure 2B:
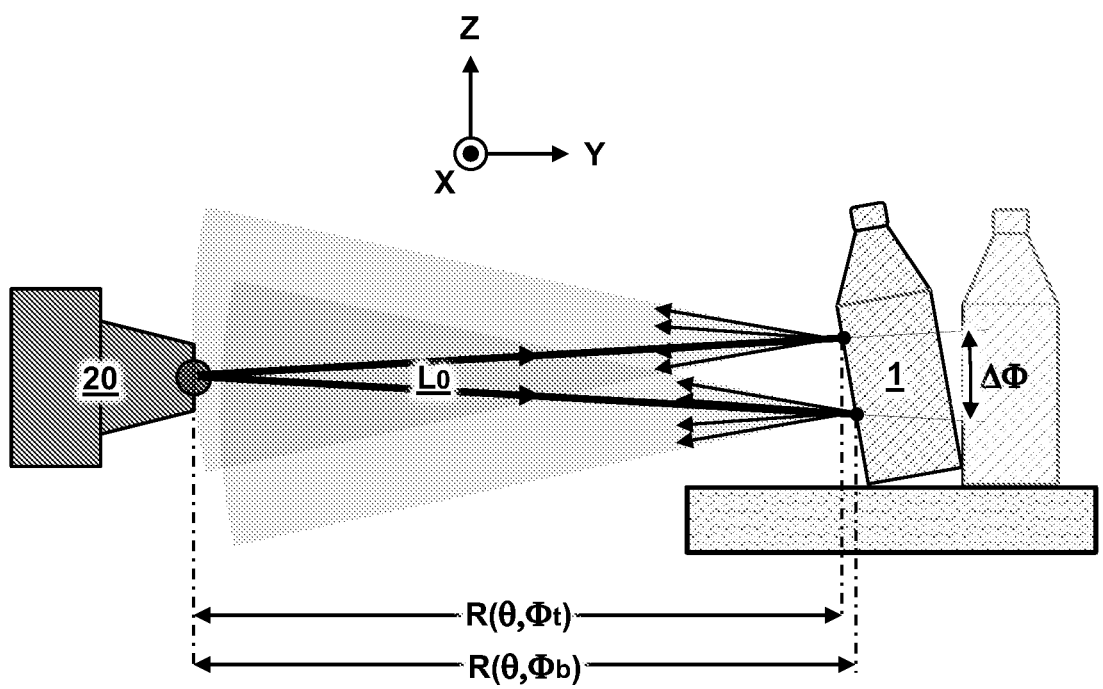
FIG. 2B illustrates a position of the products at different heights.

FIG. 2B illustrates scanning a position of the products at different heights Z. In one embodiment, e.g. as shown, the sensor device is configured to measure a position of the products 1 at different heights Z (of the same product). For example, the light rays L0 are emitted not only in a horizontal plane but e.g. two planes with different angles Φt and Φb. Advantageously, such additional measurement can be used to determine e.g. when products 1 tend to fall over, or have already fallen over. This may trigger adjustment of one or more control parameters, e.g. lubrication or cleaning to prevent the falling, or after the falling.

Figure 3A:
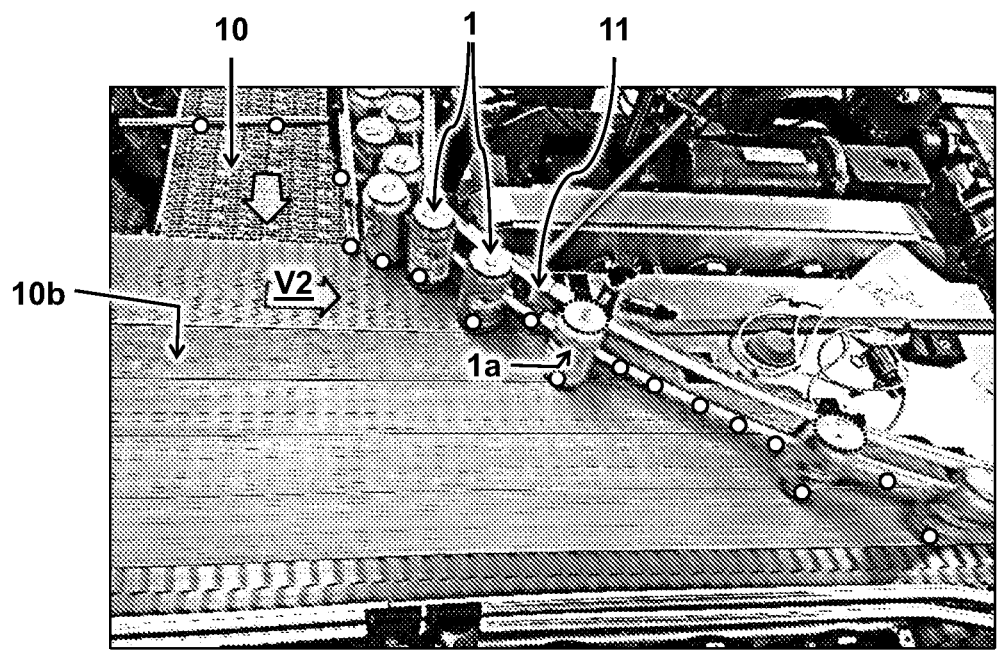
FIG. 3A illustrates a perspective camera image of products moving through a control zone between different conveyor surfaces.

FIG. 3A illustrates a perspective camera image of products 1 moving through a control zone 15 between different conveyor surfaces 10,10b. For example, white dots indicate exemplary positions where a light beam (not shown) from the side can reflect from the respective lateral sides 1a of the products 1. In the embodiment shown, the conveyor surfaces are at a transverse angle with respect to each other.

Figure 3B:
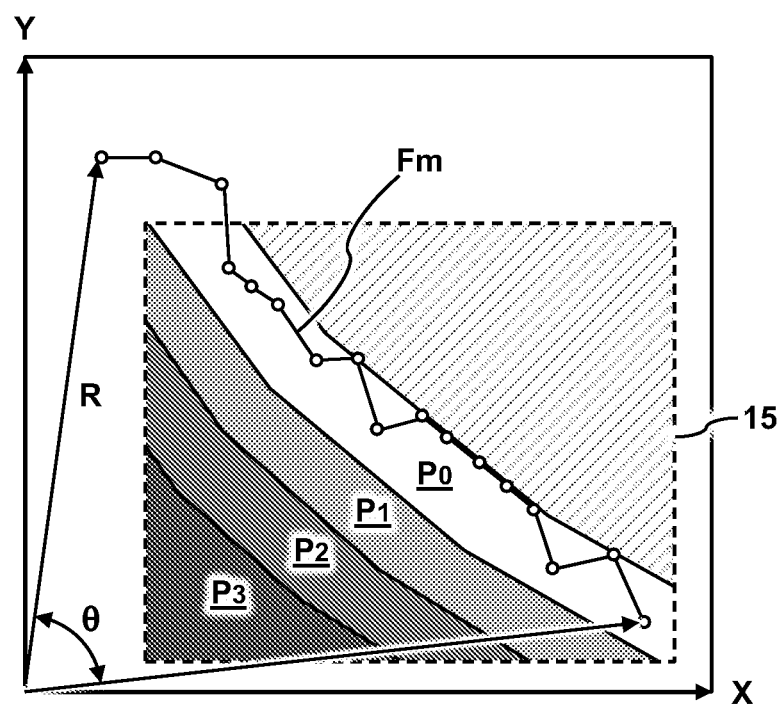
FIG. 3B illustrates a corresponding measured flow profile.

FIG. 3B illustrates a corresponding measured flow profile "Fm". In one embodiment, e.g. as shown, the predetermined flow patterns may include a flow pattern P0 wherein the number of products is relatively low. For example, as shown, some of the measurement points may correspond to a reflection off the side rail 11 instead of the products 1. In some embodiments, this may indicate a lack of products and can e.g. trigger increasing the rate of product from a preceding station or e.g. slowing a velocity V2 of the conveyor surface 20. The control zone 15 may also exclude some areas, e.g. indicated by hatching, where it is not expected to find any products. For example, in calculating an overlap area, such excluded zones can be subtracted as a border beyond which no products are found.

Figure 4A:
FIGS. 4A and 4B are similar to FIGS. 3A and 3B, respectively, except having a different product flow.
Figure 4B:
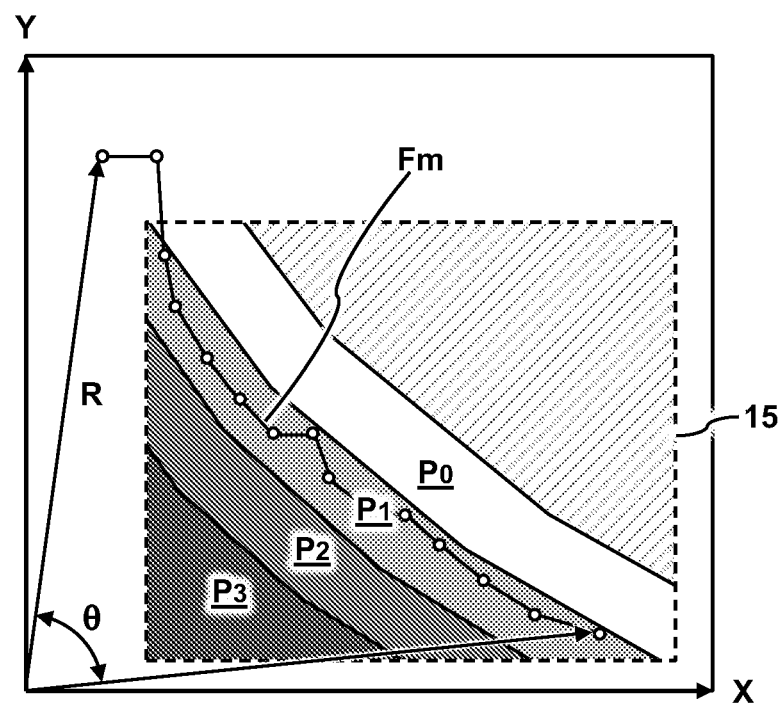

FIGS. 4A and 4B are similar to FIGS. 3A and 3B, respectively, except having a different product flow. For example, the control parameters are adjusted to provide a product flow according to the optimal flow pattern P1.

For the purpose of clarity and a concise description, features are described herein as part of the same or separate embodiments, however, it will be appreciated that the scope of the invention may include embodiments having combinations of all or some of the features described. Some aspects can be embodied as a non-transitory computer-readable medium storing instructions that, when executed by one or more processors, cause a system to perform the methods as described herein. Other or further aspects can be embodied as a system for controlling transport of products. In one embodiment, the system comprises at least one conveyor surface configured to guide the products by through a control zone. In another or further embodiment, the system comprises a sensor device configured to measure a flow profile of the products in the control zone. In another or further embodiment, the system comprises a controller configured to compare the measured flow profile to one or more predetermined flow patterns for controlling the transport based on the comparison. For example, the sensor device comprises a LIDAR device. For example, the controller comprises software or hardware configured to perform operational acts in accordance with the present methods and systems.

Also alternative ways may be envisaged by those skilled in the art having the benefit of the present disclosure for achieving a similar function and result. The various elements of the embodiments as discussed and shown offer certain advantages, such as simplified control and more accurate control. Of course, it is to be appreciated that any one of the above embodiments or processes may be combined with one or more other embodiments or processes to provide even further improvements in finding and matching designs and advantages. It is appreciated that this disclosure offers particular advantages to the control of product transport using conveyor surface, and in general can be applied for any application wherein product flow is controlled.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimd is:

1. A method for controlling transport of products, the method comprising:
    guiding the products by at least one conveyor surface through a control zone;
    measuring a flow profile of the products in the control zone; and
    comparing the measured flow profile to one or more predetermined flow patterns for controlling the transport based on the comparison;
    wherein the flow profile is measured by a sensor device disposed adjacent the products, wherein the flow profile is measured by determining a respective distance between the nearest row of products and the sensor device, wherein the distance is measured from a single point on the sensor device, and as a function of at least one angle varying in a horizontal plane of the control zone.

2. The method according to claim 1, wherein the flow profile is measured from a lateral side of the products, wherein the measured flow profile comprises a set of spatial coordinates indicating a spatial distribution of locations of the measured lateral sides of at least a subset of the products in a horizontal plane of the control zone.

3. The method according to claim 1, wherein the flow profile is measured by a sensor device using LIDAR.

4. The method according to claim 1, wherein the products are guided through the control zone by a side rail contacting the products on a first side, wherein the flow profile is measured by a sensor device measuring a second side of the products, wherein the second side is opposite the first side, wherein exclusively the flow profile of products on the second side is measured, wherein the side rail is at an angle with respect to a movement direction of the conveyor surface, wherein products abutting the side rail are forced by the rail to move partially transverse to the movement direction of the conveyor surface determining the flow profile.

5. The method according to claim 1, wherein the predetermined flow patterns are defined by dividing the control zone into different areas, wherein the flow profile complies with a predetermined flow pattern when the products are measured to pass through a respective area of the control zone corresponding to that flow pattern.

6. A method for controlling transport of products, the method comprising guiding the products by at least one conveyor surface through a control zone; measuring a flow profile of the products in the control zone;
and comparing the measured flow profile to one or more predetermined flow patterns for controlling the transport based on the comparison, wherein said measuring and comparing the flow profile to one or more predetermined flow patterns for controlling the transport comprises at least one of:
counting a number of recorded positions of the measured flow profile within an area of one of the predetermined flow patterns, wherein, the counted number within an area corresponding to a specific pattern is used to determine to what degree the product flow complies with that pattern, wherein when the number of points of the measured flow profile within an area of one of the patterns exceeds a threshold minimum, corresponding adjustments of one or more control parameters associated with that flow pattern are implemented;
determining one or more overlap areas by which the flow profile intersects with one or more of the predetermined flow patterns, wherein a magnitude of an overlap area is used as a measure for how much the flow profile complies with a predetermined flow patterns, wherein when the overlap area between a flow profile and one of the patterns exceeds a threshold area, corresponding adjustments of one or more control parameters associated with that flow pattern are implemented; and
measuring the flow profile at different instances of time, wherein the flow profile is exclusively determined to comply with a predetermined flow pattern, when at least some of the products are measured to reside in, or flow through, a respective area of the control zone during multiple different instances of time.

7. A method for controlling transport of products, the method comprising:
guiding the products by at least one conveyor surface through a control zone;
measuring a flow profile of the products in the control zone; and
comparing the measured flow profile to one or more predetermined flow patterns for controlling the transport based on the comparison;
wherein one or more control parameters determining the flow profile of the products are adjusted in response to determining that the measured flow profile complies with, or deviates from, one of the predetermined flow patterns, wherein adjusting the control parameters include at least one of:
adjusting a velocity of one or more conveyor surfaces transporting the products through the control zone, before the control zone, or after the control zone;
adjusting a position and/or angle of a side rail guiding the products over the at least one conveyor surface;
adjusting a friction coefficient between the conveyor surface and products.

8. A method for controlling transport of products, the method comprising:
guiding the products by at least one conveyor surface through a control zone;
measuring a flow profile of the products in the control zone; and
comparing the measured flow profile to one or more predetermined flow patterns for controlling the transport based on the comparison;
wherein a sensor device is configured to measure a position of the products at different heights to determine when products tend to fall over, or have already fallen over, and trigger corresponding adjustment of one or more control parameters.

9. A method for controlling transport of products, the method comprising:
guiding the products by at least one conveyor surface through a control zone;
measuring a flow profile of the products in the control zone; and
comparing the measured flow profile to one or more predetermined flow patterns for controlling the transport based on the comparison;
wherein the predetermined flow patterns comprise a first pattern according to which the products are intended to flow through the control zone in accordance with optimal processing conditions, wherein control parameters are kept the same as long as it is determined that the flow profile complies with the first pattern, wherein the predetermined flow patterns comprise a second pattern-according to which the products are still allowed to flow through the control zone in accordance with acceptable processing conditions, but which are sub-optimal, wherein one or more control parameters are adjusted based on a determining that the flow profile complies with the second pattern and/or deviates from the first pattern.

10. The method according to claim 9, wherein the predetermined flow patterns comprise a third pattern according to which the products are not allowed to flow through the control zone in accordance with unacceptable processing conditions, wherein the transport is halted when it is determined that the flow profile complies with the third pattern and/or deviates from the first and second patterns.

11. A non-transitory computer-readable medium storing instructions that, when executed by one or more processors, cause a system for controlling transport of products by at least one conveyor surface to
measure a flow profile of the products, guided by the at least one conveyor surface, through a control zone;
compare the measured flow profile to one or more predetermined flow patterns; and
control the transport of products based on the comparison;
wherein the flow profile is measured by a sensor device disposed adjacent the products, wherein the flow profile is measured by determining a respective distance between the nearest row of products and the sensor device, wherein the distance is measured from a single point on the sensor device, and as a function of at least one angle varying in a horizontal plane of the control zone.

12. A system for controlling transport of products, the system comprising:
at least one conveyor surface configured to guide the products through a control zone;

a sensor device configured to measure a flow profile of the products in the control zone; and a controller configured to compare the measured flow profile to one or more predetermined flow patterns for controlling the transport based on the comparison;

wherein the sensor device is disposed adjacent the products and configured to measure the flow profile by determining a respective distance between the nearest row of products and the sensor device, wherein the distance is measured from a single point on the sensor device, and as a function of at least one angle varying in a horizontal plane of the control zone.

13. The system according to claim 12, wherein the products are guided through the control zone by a side rail contacting the products on a first side, wherein the sensor device is configured to measure a second side of the products, wherein the second side is opposite the first side, wherein exclusively the flow profile of products on the second side is measured, wherein the side rail is at an angle with respect to a movement direction of the conveyor surface, wherein products abutting the side rail are forced by the rail to move partially transverse to the movement direction of the conveyor surface determining the flow profile.

14. The system according to claim 12, wherein the sensor device is configured to measure the flow profile at different instances of time, wherein the controller is configured to exclusively determine that the flow profile complies with a predetermined flow pattern, when at least some of the products are measured to reside in, or flow through, a respective area of the control zone during multiple different instances of time.

15. The system according to claim 12, wherein the controller is configured to adjust one or more control parameters determining the flow profile of the products in response to determining that the measured flow profile complies with, or deviates from, one of the predetermined flow patterns, wherein adjusting the control parameters include at least one of adjusting a velocity of one or more conveyor surfaces transporting the products through the control zone, before the control zone, or after the control zone;

adjusting at least one of a position and an angle of a side rail guiding the products over the at least one conveyor surface;

adjusting a friction coefficient between the conveyor surface and products.

16. The system according to claim 12, wherein the sensor device is configured to measure a position of the products at different heights for determining when products tend to fall over, or have already fallen over, and the controller is configured to trigger corresponding adjustment of one or more control parameters based on the measured position of the products at different heights.

* * * * *